United States Patent [19]

Barrett

[11] Patent Number: 5,529,496
[45] Date of Patent: Jun. 25, 1996

[54] METHOD AND DEVICE FOR TEACHING READING OF A FOREIGN LANGUAGE BASED ON CHINESE CHARACTERS

[76] Inventor: William Barrett, 124 Cleveland Dr., Croton-On-Hudson, N.Y. 10520

[21] Appl. No.: 218,542

[22] Filed: Mar. 28, 1994

[51] Int. Cl.$^6$ .................................................. G09B 19/08
[52] U.S. Cl. .................................................. 434/157
[58] Field of Search ..................................... 434/157, 156

[56] References Cited

U.S. PATENT DOCUMENTS

| | | |
|---|---|---|
| 422,682 | 3/1890 | Young . |
| 1,539,397 | 5/1925 | Matravers . |
| 2,840,926 | 7/1958 | Campbell . |
| 3,858,333 | 1/1975 | Kopp . |
| 3,958,345 | 5/1976 | Contreras . |
| 4,437,837 | 3/1984 | Schnettler ............................ 434/178 |
| 4,498,143 | 2/1985 | Strzelecki ........................... 400/110 X |
| 4,541,069 | 9/1985 | Kanou et al. ....................... 434/157 X |
| 4,597,055 | 6/1986 | Hashimoto ............................ 364/900 |
| 4,658,374 | 4/1987 | Tanimeto et al. ................... 434/157 X |
| 4,685,060 | 8/1987 | Yamano et al. ..................... 434/157 X |
| 4,820,165 | 4/1989 | Kanapa ................................. 434/276 |
| 4,891,011 | 1/1990 | Cook ..................................... 434/331 |
| 5,257,938 | 11/1993 | Tien ..................................... 434/128 |
| 5,360,343 | 11/1994 | Tang .................................. 434/157 X |

FOREIGN PATENT DOCUMENTS

| | | |
|---|---|---|
| 90116601 | 1/1992 | Japan . |
| 405341710 | 12/1993 | Japan ................................... 434/157 |
| 406175576 | 6/1994 | Japan ................................... 434/157 |
| 1159120 | 7/1969 | United Kingdom . |
| WO90/13883 | 11/1990 | WIPO . |

*Primary Examiner*—Gene Mancene
*Assistant Examiner*—Jeffrey A. Smith
*Attorney, Agent, or Firm*—Pennie & Edmonds

[57] ABSTRACT

The present invention relates to an improved method and instruction device for teaching a language based on kanji characters by presenting a compilation of approximately 210 to 420 key kanji in a systematic order. The student is then provided with the phonetic reading of the key kanji in Roman characters, hiragana and katakana. The method involves multiple reinforcement of the phonetic readings and recognition of the key kanji by providing homophones, radicals, Japanese names of the key kanji and the meanings of the key kanji. The final step includes presenting a Japanese writing for the student accompanied by the English translation, the phonetic reading and information on looking up words that the student does not know.

36 Claims, 15 Drawing Sheets

FIG. 4a

| | | | | | | | |
|---|---|---|---|---|---|---|---|
| 1 | 安楽 | 管管 | 語五 | 首 | 金 | 投殳 | |
| 2 | 以 -- | 間関 | 後行 | 受殳 | 前 -- | 党堂 | |
| 3 | 委倭 | 感撼 | 工功 | 巣售 | 組且 | 舫 | |
| 4 | 意檍 | 関間 | 公広 | 住 -- | 争（爭、筝） | | |
| 5 | 育 -- | 気汽 | 校交 | 重 -- | 送 -- | | |
| 6 | 引 刎 | 記己 | 考孝 | 出 -- | 相 | | |
| 7 | 員 韻 | 期基 | 高口 | 術述 | | | |
| 8 | 院 -- | 機幾 | 合 | | | | |
| 9 | 飲（飮） | 議義 | | | | | |
| 0 | 運 | 量挙 | -- | | | | |
| 1 | 映英 | # | | | | | |

(labels: 10, 52, 50, 18)

FIG. 4b

| | | | | | | |
|---|---|---|---|---|---|---|
| 1 | 案・按晏鮟 | 管館棺・舘 | 五悟・伍吾唔 -- | -- | ・殷殻 | |
| 2 | -- | 関閑簡・嫻 | 行・御禦 | 授・綬 | -- | ・堂棠 |
| 3 | ・倭萎逶痿 | 撼・鹹憾轗 | 功攻紅江項巧・售讐 | 祖租粗阻・咀 -- | | |
| 4 | ・噫檍 | 間・閑嫻 | 広・勾弘宏肱 -- | ・爭峥筝筝 | | |
| 5 | -- | 汽・気氛氣 | 交・佼咬狡郊 -- | -- | | |
| 6 | ・刎 | 己記紀起忌 | 孝酵・教哮桷 -- | 想穸 | | |
| 7 | 韻・殞殂 | 基旗棋・其 | 口向奥格稿 述 | | | |
| 8 | -- | 幾・畿磯譏 | 合 | | | |
| 9 | （飮） | 義儀蟻蠖 | | | | |
| 0 | ・畢 | （挙欅） | | | | |
| 1 | 英・泱暎瑛 伊 | | | | | |

(labels: 64, 62, 66, 60, 18)

FIG. 5a

| | | | | | | | | | | |
|---|---|---|---|---|---|---|---|---|---|---|
| 1 | 安 | 宀 | 官 | 宀 | 話 | 言 | 首 | 首 | 全 | 亻(人) 投 才 |
| 2 | 以 | 人 | 間 | 門 | 後 | 彳 | 受 | 又 | 前 | 刂(刀) 覚 儿 |
| 3 | 委 | 女 | 感 | 心 | 工 | 工 | 集 | 隹 | 組 | 糸 統 |
| 4 | 意 | 心 | 関 | 門 | 公 | 八 | 住 | 亻 | 争 | 亅 |
| 5 | 育 | 月 | 気 | 气 | 校 | 木 | 重 | 里 | 送 | 辶 |
| 6 | 引 | 弓 | 記 | 言 | 考 | 尹 | 出 | 凵 | 相 | 日 |
| 7 | 員 | 口 | 期 | 月 | 高 | 高 | 術 | 行 | | |
| 8 | 院 | 阝 | 機 | 木 | 合 | 口 | | | | |
| 9 | 飲 | 食 | 議 | 言 | | | | | | |
| 0 | 運 | 辶 | 挙 | 手 | | | | | | |
| 1 | 映 | 日 | 共 | | | | | | | |
| 2 | 演 | 氵 | | | | | | | | |

FIG. 5b

| | | | | | | |
|---|---|---|---|---|---|---|
| 1 | KANA U | KANA U | SPEAK | NECK, HEAD | MAN (roof) | HAND |
| 2 | MAN | GATE | GOING MAN | AGAIN | SWORD | LEGS |
| 3 | WOMAN | HEART | KANA E | FAT BIRD | THREAD | |
| 4 | HEART | GATE | EIGHT | MAN | HOOK | |
| 5 | MOON | AIR | TREE | VILLAGE | ADVAN | |
| 6 | BOW (weapon) | SPEAK | OLD | CONTAINER | | |
| 7 | MOUTH | MOON | HIGH | | | |
| 8 | HAMLET | TREE | | | | |
| 9 | FOOD, EAT | SPEAK | | | | |
| 0 | ADVANCE | HAN | | | | |
| 1 | DAY, SUN | | | | | |

FIG. 7a — 74

| 1 | 安 40 | 官 40 | 語 60 | 首 185 | 全 9 | 投 64 |
| 2 | 以 9 | 間 165 | 後 60 | 受 29 | 前 61 | 党 |
| 3 | 委 38 | 感 61 | 工 48 | 集 172 | 組 120 | |
| 4 | 意 61 | 関 169 | 公 12 | 住 9 | 争 | |
| 5 | 育 130 | 気 84 | 校 75 | 重 166 | 送 | |
| 6 | 引 57 | 記 149 | 考 125 | 出 17 | | |
| 7 | 員 30 | 期 130 | 高 | | | |
| 8 | 院 170 | 機 75 | | | | |
| 9 | 飲 184 | 議 1 | | | | |
| 0 | 運 162 | が | | | | |
| 1 | 映 | | | | | |

FIG. 7b — 74, 76

| 1 いち | 30 くち | 60 ぎょうにんべん | 90 しょうへん | 120 いと | 150 たに |
| 2 ぼう | 31 くにがまえ | 61 こころ・りっしんべん | 91 かたへん | 121 はとぎ | 151 まめ |
| 3 てん | 32 つち | 62 ほこづくり | 92 きば | 122 よこめ | |
| 4 の | 33 さむらい | 63 とかんむり | 93 うし | 123 ひつじ | |
| 5 おつ | 34 なつあし | 64 て | 94 いぬ・けものへん | 124 | |
| 6 せかんぼう | 35 すいにょう | 65 し | 95 げん | | |
| 7 に | 36 た | 66 ぼくにょう | | | |
| 8 なべぶた | 37 だい | | | | |
| 9 ひと (やね) | 38 おんな | | | | |
|   にんべん | 39 こ | | | | |
| 10 ひとあし | | | | | |

10 162

| | | | | | | |
|---|---|---|---|---|---|---|
| 1 | 安全 | 長官 | 国語 | 首相 | 全体 | 投資 |
| 2 | 以内 | 民間 | 最後 | 受験 | 以前 | 野党 |
| 3 | 委員 | 同感 | 工事 | 集団 | 組閣 | |
| 4 | 意見 | 関心 | 公務 | 住所 | 争議 | |
| 5 | 教育 | 電気 | 校長 | 重要 | 送検 | |
| 6 | 引用 | 記事 | 思考 | 輸出 | | |
| 7 | 議員 | 時期 | 最高 | | | |
| 8 | 入院 | 機関 | 合 | | | |
| 9 | 飲料 | 議員 | | | | |
| 0 | 運動 | 検挙 | | | | |
| 1 | 映画 | | | | | |

| 安 3042 | 官 3431 | 語 386C | 首 3C73 | 全 4134 | 投 456A |
|---|---|---|---|---|---|
| 以 304A | 間 3456 | 後 3865 | 受 3C75 | 前 4130 | 党 455F |
| 委 3051 | 感 3436 | 工 3929 | 集 3D38 | 組 4148 | |
| 意 3055 | 関 3458 | 公 3878 | 住 3D3B | 争 4168 | |
| 育 3069 | 気 3524 | 校 392B | 重 3D45 | 送 417? | |
| 引 307A | 記 352D | 考 394D | 出 3D50 | | |
| 員 3077 | 期 347C | 高 3962 | | | |
| 院 3121 | 機 3521 | | | | |
| 飲 307B | 議 3544 | | | | |
| 運 313F | 挙 35? | | | | |
| 映 314? | | | | | |

| 問題 | 関心 | 新聞 | 今度 | 最後 | 大臣 | 参加 | 一方 | 大会 | 協力 | 心配 | 機械 |
| 政府 | 資本 | 当時 | 内閣 | 教授 | 空気 | 少年 | 輸入 | 利用 | 比較 | 水準 | 基礎 |
| 主義 | 現在 | 独立 | 文学 | 統一 | 方向 | 軍隊 | 自衛 | 自己 | 命令 | 発見 | |
| 自分 | 共産 | 軍事 | 当然 | 制度 | 原爆 | 原因 | 自国 | 義務 | 今年 | | |
| 国民 | 大学 | 正当 | 原子 | 相当 | 最初 | 諸君 | 建設 | 生徒 | 実験 | | |
| 経済 | 時代 | 国家 | 最近 | 地方 | 最大 | 主権 | 状態 | 各国 | | | |
| 政治 | 以上 | 子供 | 大衆 | 批判 | 完全 | 兵器 | 将来 | | | | |
| 社会 | 民主 | 連中 | 結果 | 努力 | 決定 | | | | | | |
| 自由 | 政策 | 意義 | 解決 | 機関 | | | | | | | |
| 世界 | 非常 | 会議 | 目的 | | | | | | | | |
| 映画 | 学校 | 援助 | | | | | | | | | |
| 戦争 | 生産 | | | | | | | | | | |

METHOD AND DEVICE FOR TEACHING READING OF A FOREIGN LANGUAGE BASED ON CHINESE CHARACTERS

TECHNICAL FIELD

The invention relates generally to the field of teaching reading of foreign languages that use Chinese kanji characters and more specifically to the field of teaching how to read Japanese.

CROSS-REFERENCE TO SUBMITTED APPENDICES

The preferred method and device for teaching Japanese according to the present invention is being filed as Appendix A to the present application.

BACKGROUND OF THE INVENTION

This invention relates to a new teaching method and device for teaching students how to read Japanese. The Japanese language, like other Far East languages, is written using Chinese characters called kanji. Learning all of the kanji is close to impossible. In fact, a person knowing only about two thousand (2000) kanji is considered literate in Japanese.

The traditional method of teaching a student the Japanese language generally starts with teaching the phonetic kana syllabary. Kana consists of 46 characters that define each of the phonetic sounds of the Japanese language. The kana syllabaries are very similar to the western alphabet in that they can be used to write words phonetically.

The next step in teaching Japanese is teaching students kanji so that they can read Japanese text. Most teaching devices for teaching kanji are directed to teaching the basic two thousand (2000) kanji. These systems generally comprise of teaching the student the kanji which are taught in Japanese elementary schools or by taking kanji off of a standard list. The elementary school kanji consist of approximately 1000 kanji and are basic vocabulary. However, learning two thousand (2000) kanji to be literate, is still a very difficult, time consuming task.

Adult Americans need a system that will enable them to read the text of Japanese periodicals such as the *Chuu'oo Kooron* and the *Bungei Shunjuu* respectively the equivalent of *Foreign Affairs* and *the Atlantic Monthly*. The Japanese learn approximately 1000 kanji in six years of elementary school. Usually, Adult Americans do not have this amount of time to learn kanji.

Thus, there is a need for a method that can teach one how to read kanji characters in a simple yet meaningful way so as to avoid memorizing thousands of such characters as well as to avoid the inherent redundancies (duplication of radical/ kanji homophones) in the prior art in systems. The present invention provides one method which satisfied that need.

SUMMARY OF THE INVENTION

An object of the current invention is to provide an improved method and device for the teaching of a written language that is based on the use of Chinese kanji characters. More particularly, the object is to provide a method and device for teaching a student how to read languages such as Japanese which are written in kanji that overcomes many of the shortcomings of the prior art.

Another object of the present invention is to provide an improved method and device for teaching a person to read Japanese newspapers, periodicals and books that are written in kanji and kana.

Still another object of the present invention is to provide a method and device for teaching a student to read kana and kanji phonetically.

Yet still another object of the present invention is to provide a device that can be used as a learning tool and as a reference guide that overcomes the shortcomings of the prior art. More particularly, it is an object of the present invention to provide a device that enables a student to easily master kanji that are used in Japanese writings and that can be use as a quick reference guide when looking up definitions.

The present invention meets the above objectives by providing a compilation of key kanji that are frequently used in Japanese writings, particularly in periodicals. By providing a compilation of key kanji that is substantially less than all kanji, the student has a set of kanji that is manageable to learn in a much shorter time. More particularly, the key kanji should be less than about five hundred (500) characters and is preferably on the order of about two hundred (200) characters. Still more particularly, the key kanji should be arrange in a systematic order such that the student can more easily follow the learning process and refer to the key kanji list. By learning the key kanji according to the present invention, a student is able to read a substantial amount of the characters used in Japanese periodicals and effectively utilize Japanese-English dictionaries.

The present invention more particularly uses an improved method of teaching so that the student becomes extremely familiar with the key kanji and many of the key kanji homophones and commonly used radicals. The present invention also teaches a beginning student hiragana and katakana which is used in Japanese newspapers, periodicals and books.

Still more particularly, the present invention meets the above-identified objectives by providing a method of learning the key kanji comprising the first step of learning the on-yomi (phonetic readings) of the key kanji. This first step includes teaching the student the key kanji on-yomi readings by providing the key kanji and the corresponding phonetic reading such that the student is quickly provided access to the reading. This can be accomplished by providing a corresponding list of on-yomi readings adjacent to the key kanji list, by displaying the key kanji with on-yomi reading adjacent to the key kanji or by providing the key kanji with audio on-yomi reading simultaneously or immediately following the visual presentation of the key kanji.

Furthermore, the first step provides for multiple reinforcement of the on-yomi readings of the key kanji by providing the student with the on-yomi readings in roman characters, hiragana and katakana. By repeating the on-yomi readings, the student is over taught the key kanji readings and learns hiragana and katakana. This step can also be used to introduce the student to partial cognates and true cognates of the key kanji so that the student can learn to use the key kanji as a basis for learning other kanji by recognizing common grapho-phonetic elements.

The present invention provides a second step of providing the student with the key kanji and corresponding homophones of the key kanji. This further reinforces the readings of the key kanji by reassociating the kanji with the on-yomi reading and increases the number of kanji that the student knows or can recognize. This step generally comprises visualizing the key kanji with multiple homophone kanji adjacent thereto. It should be noted that all the homophones share a grapho-phonetic element with the key kanji.

The present invention provides a third step of teaching radicals. This step comprises the sub steps of providing the radicals in conjunction with key kanji that often use the radical, providing both the Japanese and English names of the radicals and then providing on-yomi readings of radicals that double as kanji. By teaching the student both the Japanese and English names of the radicals and then teaching the student the on-yomi of radicals that double as characters, the readings of the key kanji and of the radical is reinforced and the number of kanji the student will recognize is increased.

The fourth step of the present invention includes providing the kun-yomi readings of the key kanji. The kun-yomi is the native Japanese reading of the key kanji and the definition of the kanji.

The present invention provides a fifth step where the student is taught the meaning of the key kanji in both Japanese and English. It should be noted that the definitions of the kanji can change dramatically depending upon radical used with the kanji. However, as shown earlier in the second step, adding different radicals to the kanji often does not change the kanji's on-yomi reading. This step, thus, provides the student with chance to return to the on-yomi reading of the key kanji and a first look at kanji meanings. In this way, the student is very familiar with the kanji before trying to memorize their definitions.

The sixth step of the present invention is a further reinforcement of learning the key kanji by teaching the student common kanji compounds composed of the key kanji. This step further solidifies the recognition of the key kanji and reinforces the on-yomi readings.

The present invention also comprises a practice step of providing the student with the key kanji and the corresponding Japanese Industrial Standard (JIS) Code and teaching the student how to utilize the same for translating Japanese writings. The JIS Code is very advantageous to learn because it can provide an easy way to look up words rapidly in Japanese dictionaries, particularly, electronic dictionaries that use the JIS Code. By this step, the student is very familiar with the key kanji and their locations in the compilations. Thus, it becomes very easy for the student to use this compilation as a dictionary as well as for learning the JIS Code and reinforcing the key kanji. This step also includes a sub step of teaching the student how to use the JIS Code through examples.

Another part of the method for teaching a student to read Japanese involves the actual reading of Japanese. An example writing is provided for the student to read with the aid of the English translation, JIS Code information and the on-kun readings. The student is now familiar with the key kanji as well as the katakana that are used in this document. Therefore, it provides a good reinforcement of the kanji teachings that were established in the aforementioned steps.

A still additional part of the invention includes providing the student with an expanded compilation of key kanji and kanji compounds. This expanded list of key kanji can greatly increase the number of kanji that the student can recognize. The expanded compilation of key kanji incorporates the original key kanji and is presented so that the student is quickly provided the on-yomi reading of the kanji. This strengthens the students recognition of the original key kanji and provides a step to further increase the number of kanji the student can recognize. Furthermore, the student is provided a compilation of kanji compounds that are frequently used in Japanese writings. The student is encourages to read the compounds to increase her kanji recognition and reading skills.

The present invention further meets the aforementioned objectives by providing an improved learning device of a compilation of key kanji organized according to the gojuu-on or Japanese sound table that forms the Japanese "alphabet." The key kanji, properly organized, are presented on a single sheet of material preferably in column and row form. By using a single sheet of material, the student is provided with an efficient reference guide that is quickly mastered for quick recognition during the initial learning stages and later referral. In this manner, the student can be provided with the many learning steps in a repetition manner which further aids the learning process.

The method and device of the present invention will become more easily understood and apparent when referring to the following detailed description of the preferred embodiments.

BRIEF DESCRIPTION OF THE DRAWINGS

The invention will be better understood if reference is made to the accompanying drawings, in which:

FIG. 4a is a section of the plurality of key kanji of FIG. 1a with common homophones to the right of the key kanji;

FIG. 4b is a section of a plurality of homophones of the key kanji in FIG. 4a presented to correspond to the key kanji format of FIG. 1a;

FIG. 5a is a section of the key kanji of FIG. 1a presented with key kanji radicals to the right of each key kanji;

FIG. 5b is a section of the corresponding names of the radicals of FIG. 5a in English;

FIG. 7a is a section of the key kanji of FIG. 1a presented with the radical number to the right of each kanji;

FIG. 7b is a section identifying the radical by number and name in hiragana;

FIG. 11 is a section of key kanji compounds;

FIG. 12 is a section of key kanji and key kanji JIS Code numerals;

FIG. 15 is a section of a compilation of kanji compounds.

DETAILED DESCRIPTION OF THE INVENTION

Figure 1A:
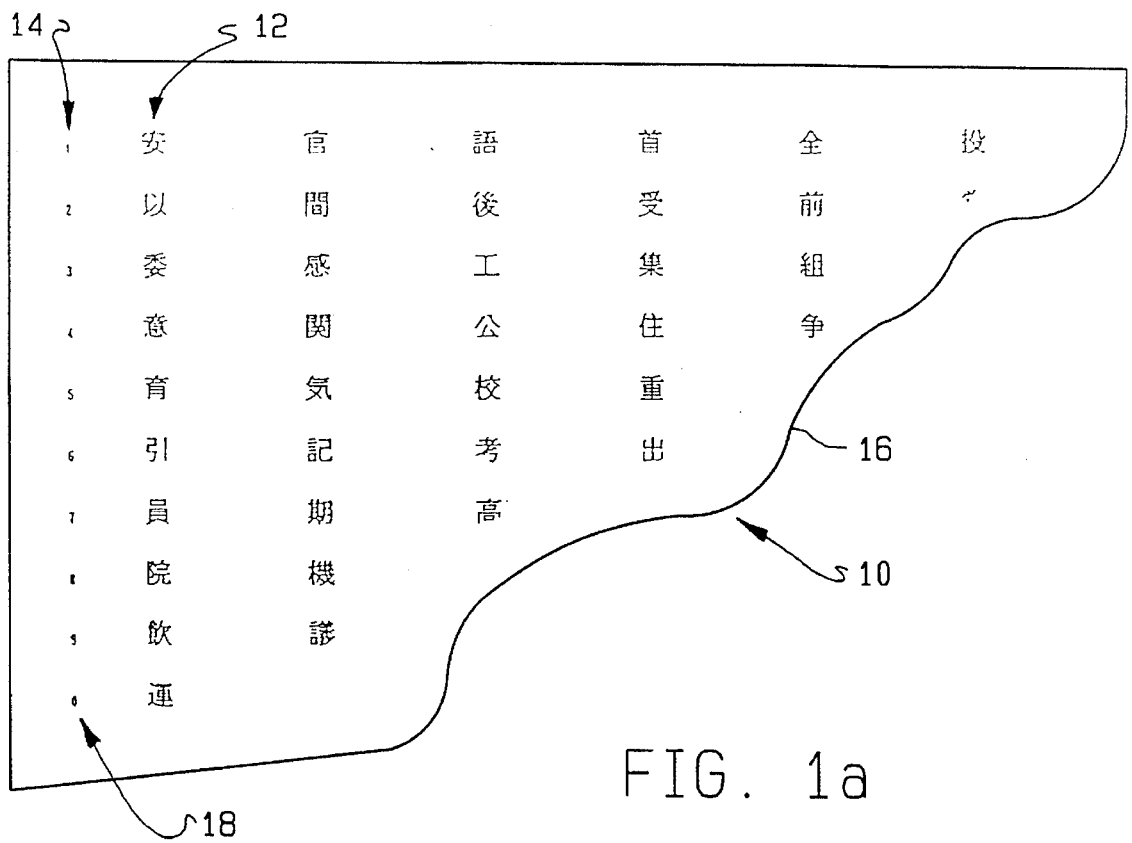
FIG. 1a is a section of a plurality of key kanji being presented in a column and row format.

Referring to FIG. 1a, a compilation of key kanji 10 is shown in columns 12 and in rows 14. In the preferred embodiment, the compilation of key kanji 10 is provided in a systematic order. Systematic should be interpreted according to its plain meaning, but, as shown in FIG. 1a, it includes providing the key kanji 10 in columns 12 and rows 14, on a single sheet of material 16. A numerical index 18 is also provided to locate the key kanji. Preferably, the key kanji 10 are arranged in the systematic order of the gojuu-on zu (similar to alphabetically in English) that form the kana (the Japanese "alphabet"). By providing the key kanji 10 in the gojuu-on order, the student naturally learns the gojuu-on system and enables the student to use Japanese-English dictionaries that are based on the syllabaries.

Key kanji 10 are common kanji. Preferably, the key kanji 10 are those kanji that most often appear in selective writings. As an example, in the embodiment of the invention described herein, the key kanji 10 are compiled for general Japanese reading with a slight bias for reading periodicals, newspapers and books. The key kanji 10 can be selected so that the key kanji 10 do not include high frequency radicals that also serve as kanji. The selection of key kanji can favor kanji that appear as the head character in kanji compounds and can avoid homophones of the key kanji. The key kanji 10 should be selected such that a student is not over burdened with trying to memorize them. Therefore, the key kanji 10 should be comprised of approximately five hundred 500 kanji or less, not enough for literary.

FIG. 1a shows that the key kanji 10 are listed by columns 12 such that the student reads the key kanji 10 by starting in the upper left hand corner and reading down the first column 12 and working column by column to the right. In the preferred embodiment, the key kanji 10 are comprised of approximately 180 to 240 kanji. More particularly, 7 columns of 30 kanji each is preferred so that there are 210 key kanji 10. In this manner, the student is provided with a manageable list of kanji to learn and memorize. Further-more, by presenting the key kanji 10 in a systematic order, the student can memorize the key kanji 10 quicker and can more easily refer back to the key kanji 10.

Figure 1B:
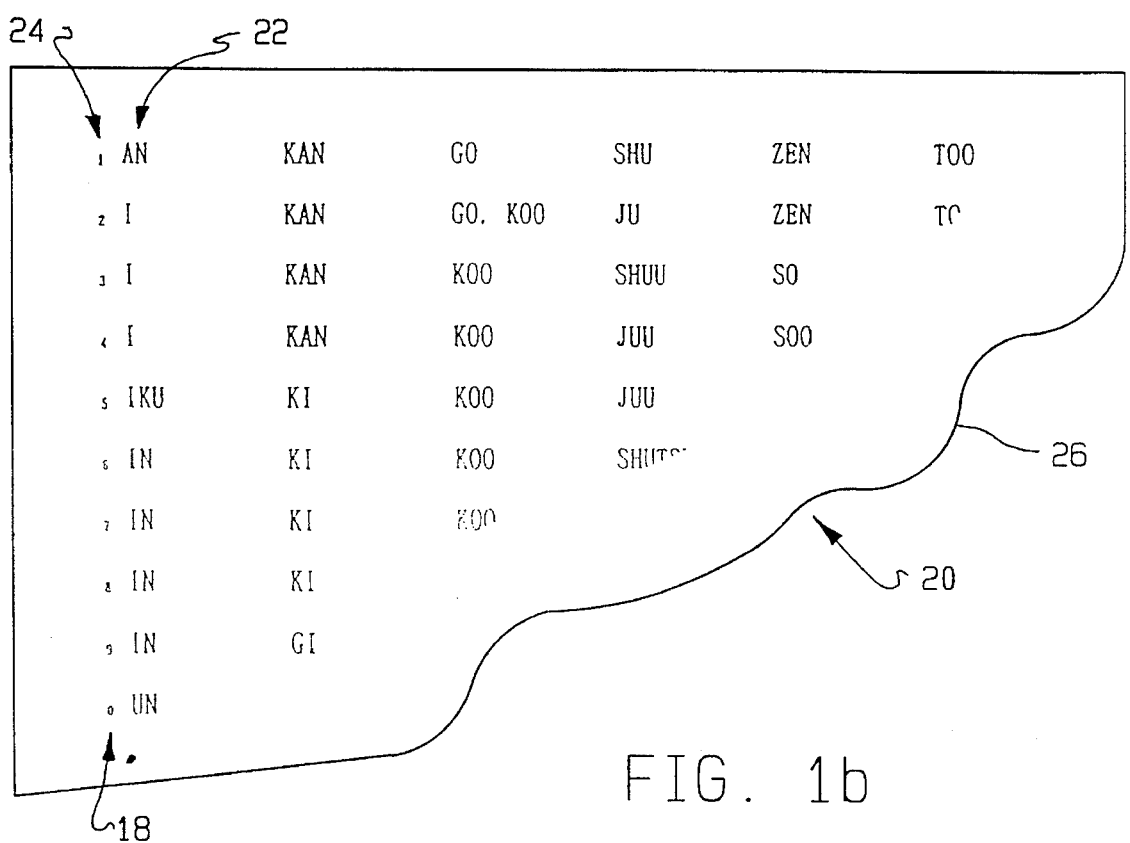
FIG. 1b is a section of the corresponding on-yomi readings of the key kanji in FIG. 1a presented in roman characters.

FIG. 1b shows the corresponding on-yomi readings or phonetic readings for the key kanji in roman characters 20. Similar to the key kanji 10 in FIG. 1a, the roman character on-yomi or phonetic readings 20 are presented in columns 22 and rows 24 on a single sheet of material 26. In this manner, the roman character on-yomi reading 20 follows the key kanji reading 10 and the student can quickly refer to the roman on-yomi reading 20 as she reads the key kanji 10. It should be noted that while the preferred embodiment is to present the on-yomi in a visual form as in FIG. 1b, the on-yomi reading could be presented or supplemented with audio presentation of the on-yomi reading 20. An audio presentation can comprise of a voice reading the key kanji 10 following the column format so that the student can visually read the key kanji 10 while listening to on-yomi reading. Preferably, the audio presentation is recorded such that the student can review the key kanji multiple times.

Figure 2A:
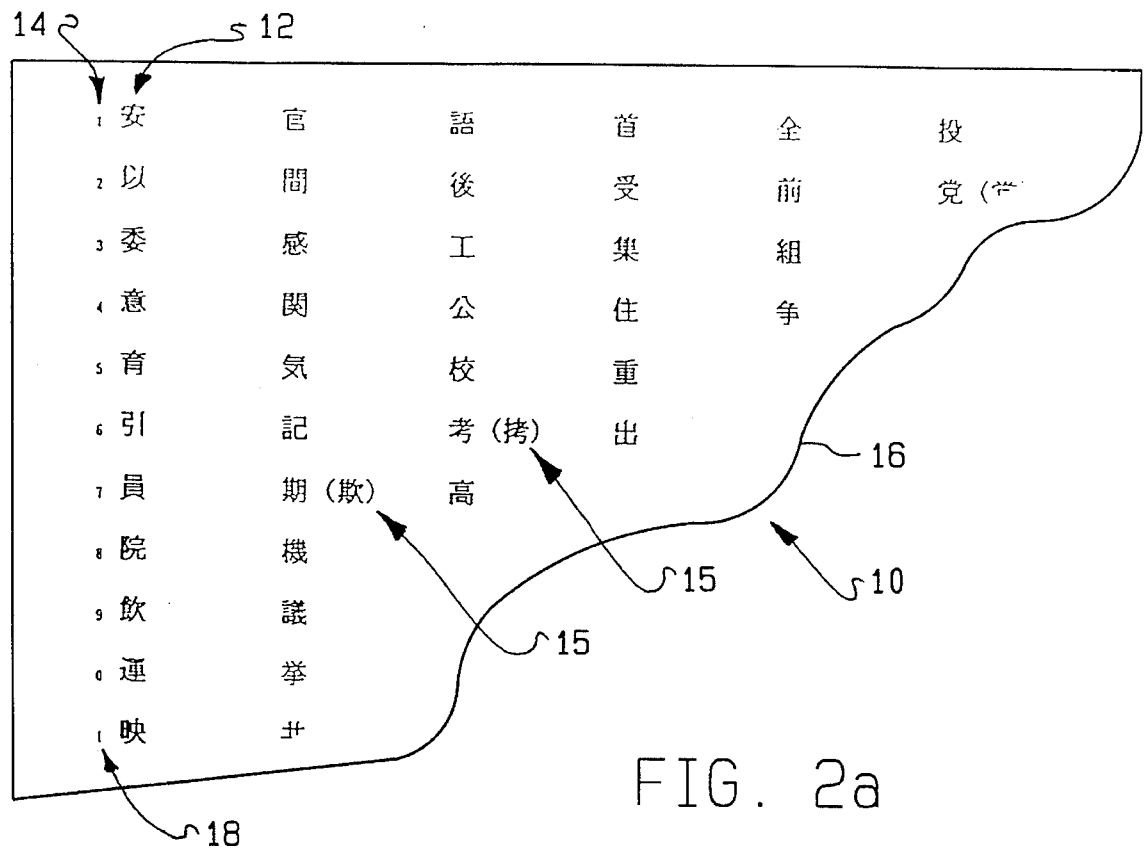
FIG. 2a is a section of a plurality of key kanji and some partial cognates thereof being presented in a column and row format.

Referring to FIG. 2a, the compilation of key kanji 10 is shown, again in columns 12 and in rows 14. However in this figure, several partial cognates 15 are presented. The partial cognates 15 are kanji that, thanks to a grapho-phonetic element, share a similar pronunciation with the corresponding key kanji 10, e.g., KI and GI are presented in column 2, line 7. By presenting the partial cognates 15, the number of kanji the student can recognize is increased.

Figure 2B:
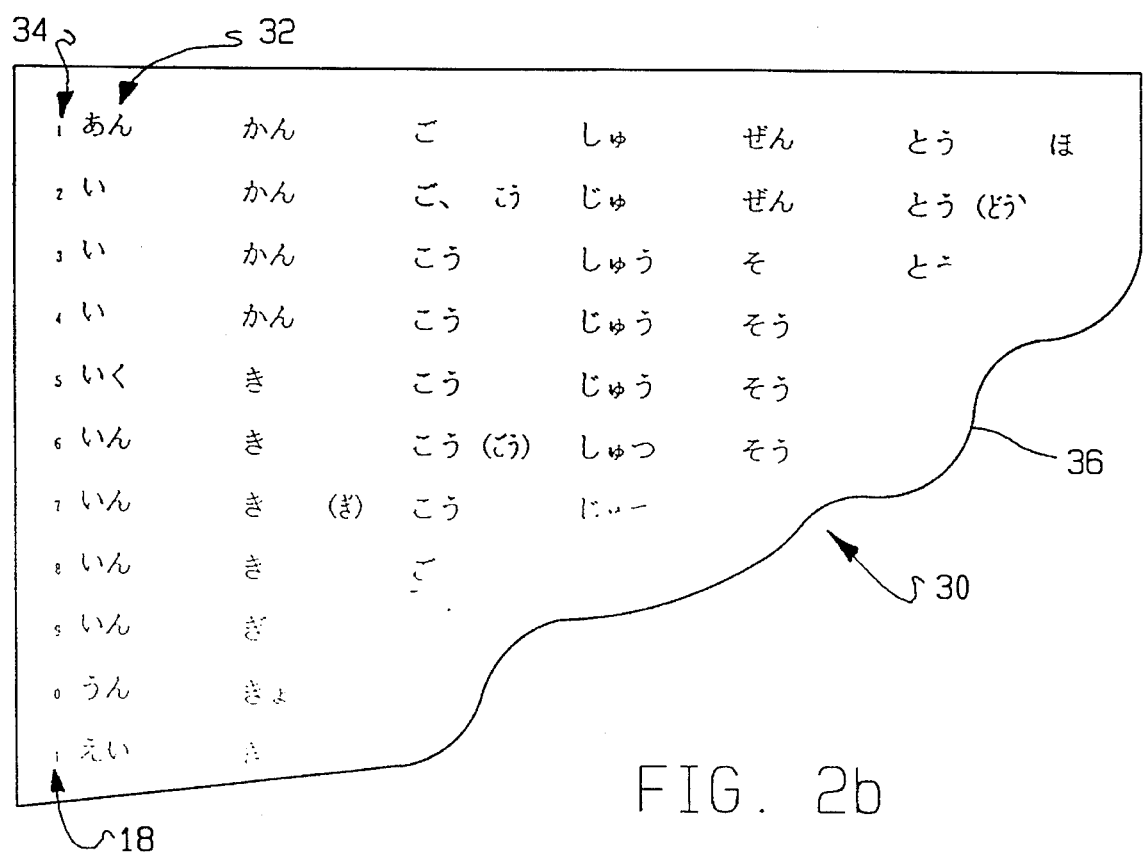
FIG. 2b is a section of the corresponding on-yomi readings of the key kanji and partial cognates in FIG. 2a presented in hiragana.

FIG. 2b shows the corresponding on-yomi readings or phonetic readings for the key kanji 10 and partial cognates 15 in hiragana 30 which is similar to the English alphabet. Again, the hiragana on-yomi 30 or phonetic readings are presented in columns 32 and rows 34 on a single sheet of material 36. In this manner, the hiragana on-yomi reading 30 follows the key kanji reading 10 or the partial cognate 15 and the student can quickly refer to the hiragana on-yomi reading 30 as she reads the key kanji 10.

Figure 3A:
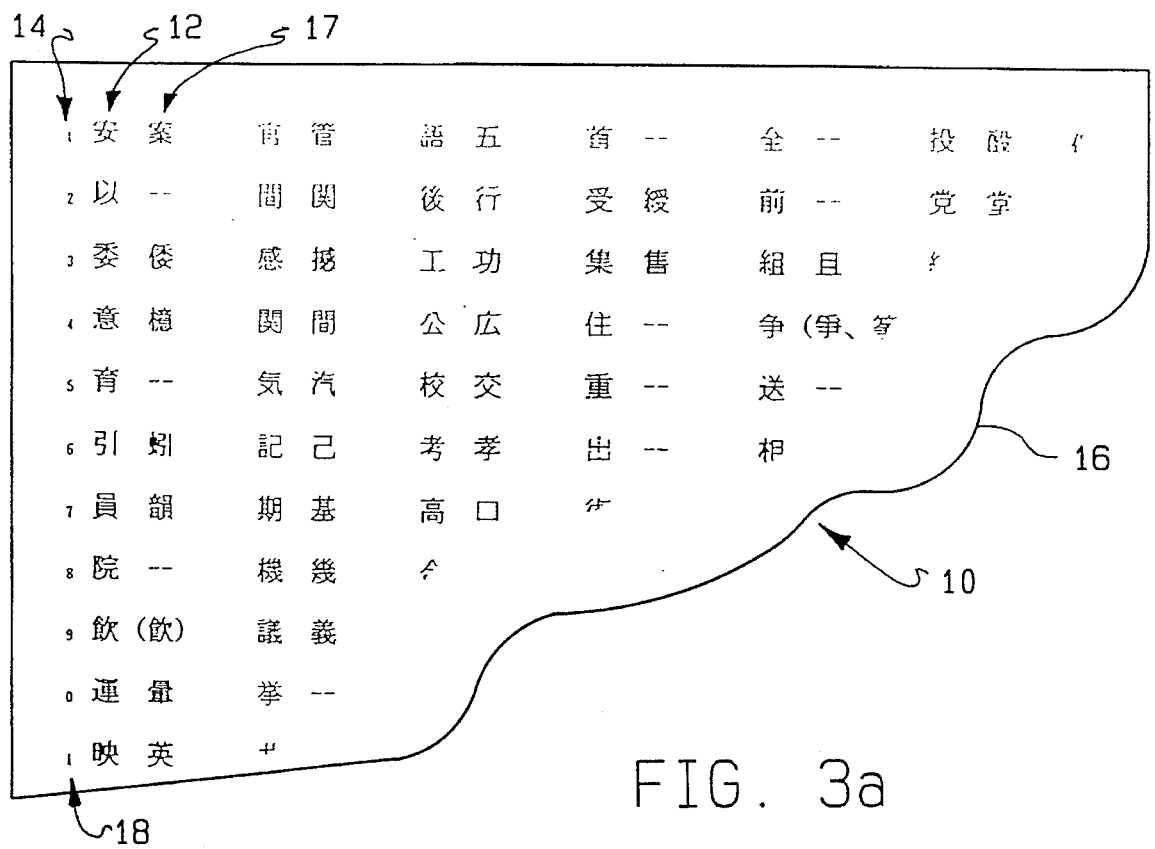
FIG. 3a is a section of a plurality of key kanji and some true cognates thereof being presented in a column and row format.

Referring to FIG. 3a, the compilation of key kanji 10 is shown. However in this figure, true cognates 17 of some of the key kanji 10 are presented. The true cognates 17 are kanji that share a grapho-phonetic element and the phonetic reading with the corresponding key kanji 10, e.g., AN and AN in column 1, line 1. By presenting the true cognates 17, the number of kanji the student is learning is increased.

Figure 3B:
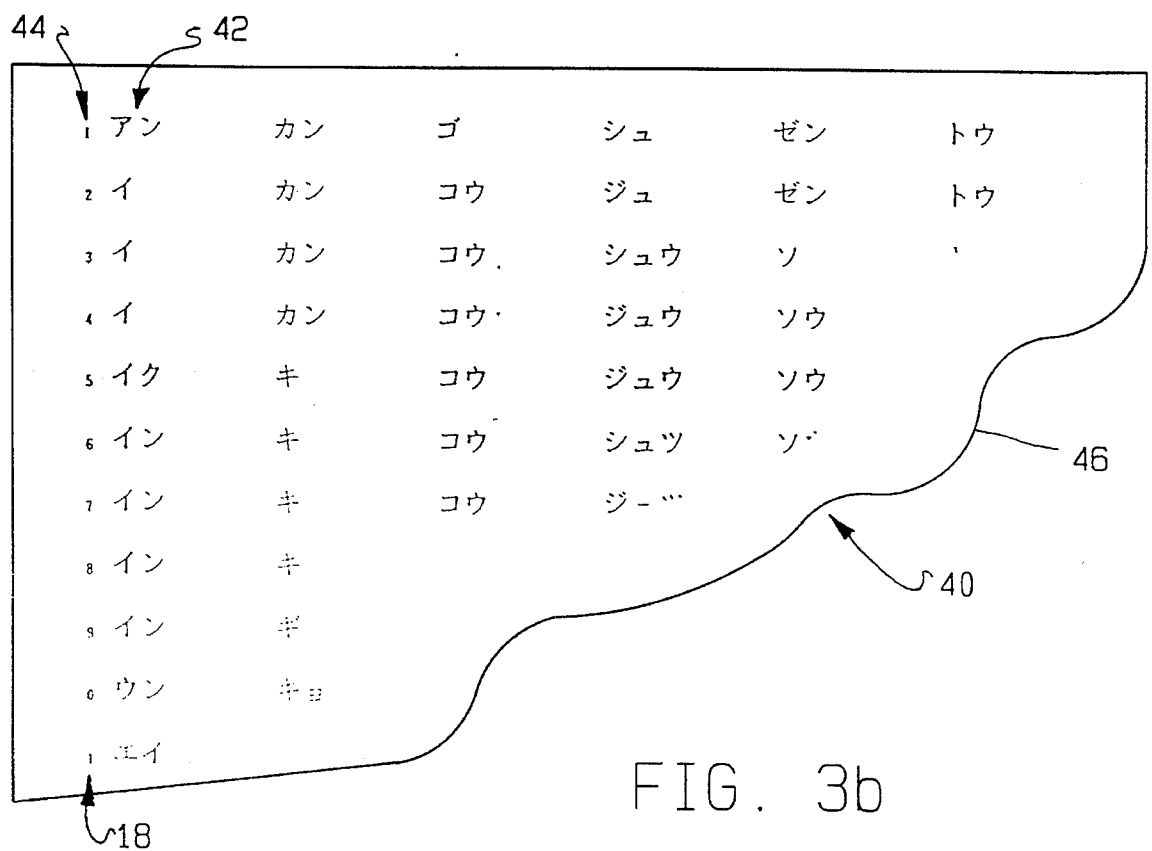
FIG. 3b is a section of the corresponding on-yomi readings of the key kanji and true cognates in FIG. 3a presented in katakana.

FIG. 3b shows the corresponding on-yomi readings or phonetic readings for the key kanji 10 in katakana 40 which is used similar to the English alphabet. Similar to the key kanji 10 in FIGS. 1a and 3a, the katakana on-yomi or phonetic readings are presented in columns 42 and rows 44 on a single sheet of material 46. In this manner, the katakana on-yomi readings 40 follows the key kanji reading 10 and the student can quickly refer to the katakana on-yomi reading 40 as she reads the key kanji 10 and the true cognates 17.

Now referring to FIGS. 4a and 4b, the key kanji 10 of FIG. 1a are presented to the student with homophone kanji 50. FIG. 4a shows the key kanji 10 in the same format as FIG. 1a. However, adjacent to many of the key kanji 10 in FIG. 4a are common homophone kanji 52. The common homophone kanji 52 are true cognates of the key kanji 10. Since the common homophone kanji 52 sound the same as key kanji 10, their on-yomi reading is the same as the key kanji 10. Similarly, in FIG. 4b, multiple homophones 60 of the key kanji 10 are presented in the same column and row format to correspond to the key kanji 10. In this compilation, the multiple homophones 60 are separated by dots 62 into more common homophones 64 to the left of the dots 62 and less common homophones 66 to the right of the dots 62.

FIG. 5a shows a compilation of key kanji and their radicals 72. The kanji radical 72 is presented to the right of the key kanji 10. Again, the key kanji 10 are provided in the systematic order and on a single sheet of material 70 as in FIG. 1a. As shown, the kanji radicals 72 are part of the key kanji 10.

FIGS. 5b provides the names 80 to the radicals 72 in English. The radical names 80 are provided in column and row format to correspond to FIG. 5a.

Figures 6A, 6B:
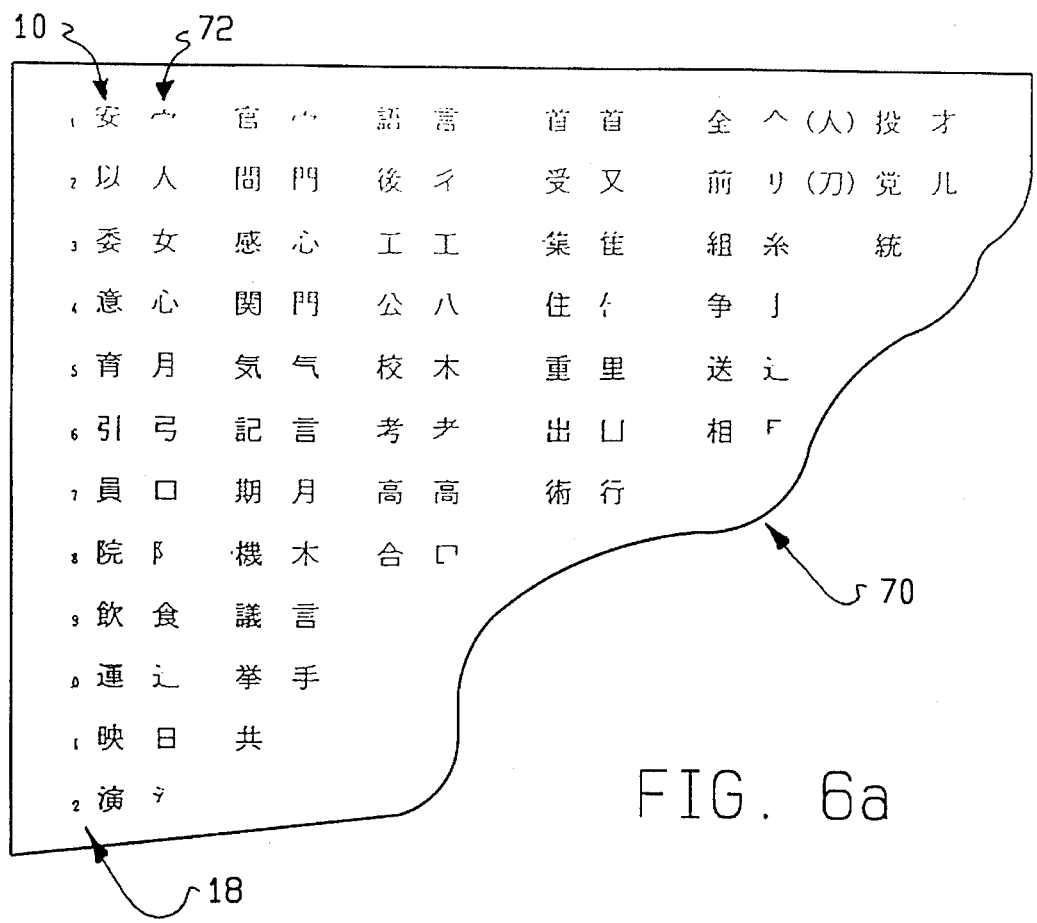
FIG. 6a is a section of the key kanji of FIG. 1a presented with key kanji radicals to the right of each key kanji.
FIG. 6b is a section of the corresponding radical names of the radicals presented in FIG. 6a in Japanese.

FIG. 6a shows the compilation of key kanji and radicals 70.

FIGS. 6b provides the names 90 to the radicals 72 in Japanese. The radical names 90 are provided in hiragana and in column and row format to correspond to FIG. 6a.

FIG. 7a presents the key kanji 10 with the key kanji radical reference numeral 74 to the right of each key kanji 10.

FIG. 7b presents the key kanji radicals Japanese names 100 in hiragana. In this figure, the Japanese names 100 are presented with the hiragana of the name 76 and the reference numeral 74. This compilation of the Japanese names 100 does not follow the order of FIG. 7a, but is organized in numerical order according to the reference numerals 74. This compilation of Japanese names 100 can be used in conjunction with the key kanji 10 and radicals 72 by using the reference numerals 74.

Figure 8A:
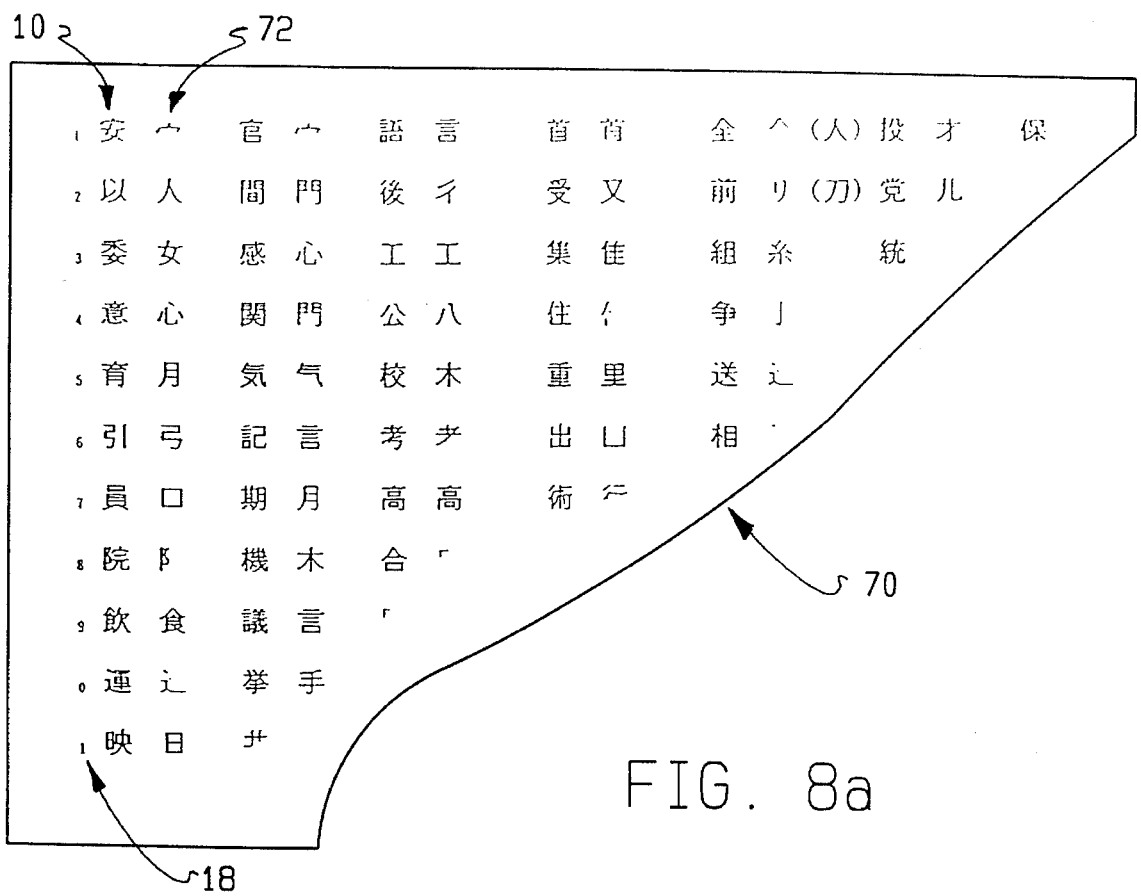
FIG. 8a is a section of the key kanji of FIG. 1a presented with key kanji radicals to the right of each key kanji.

FIG. 8a shows the compilation of key kanji and key kanji radicals 70 as shown in FIGS. 5a and 6a.

Figure 8B:
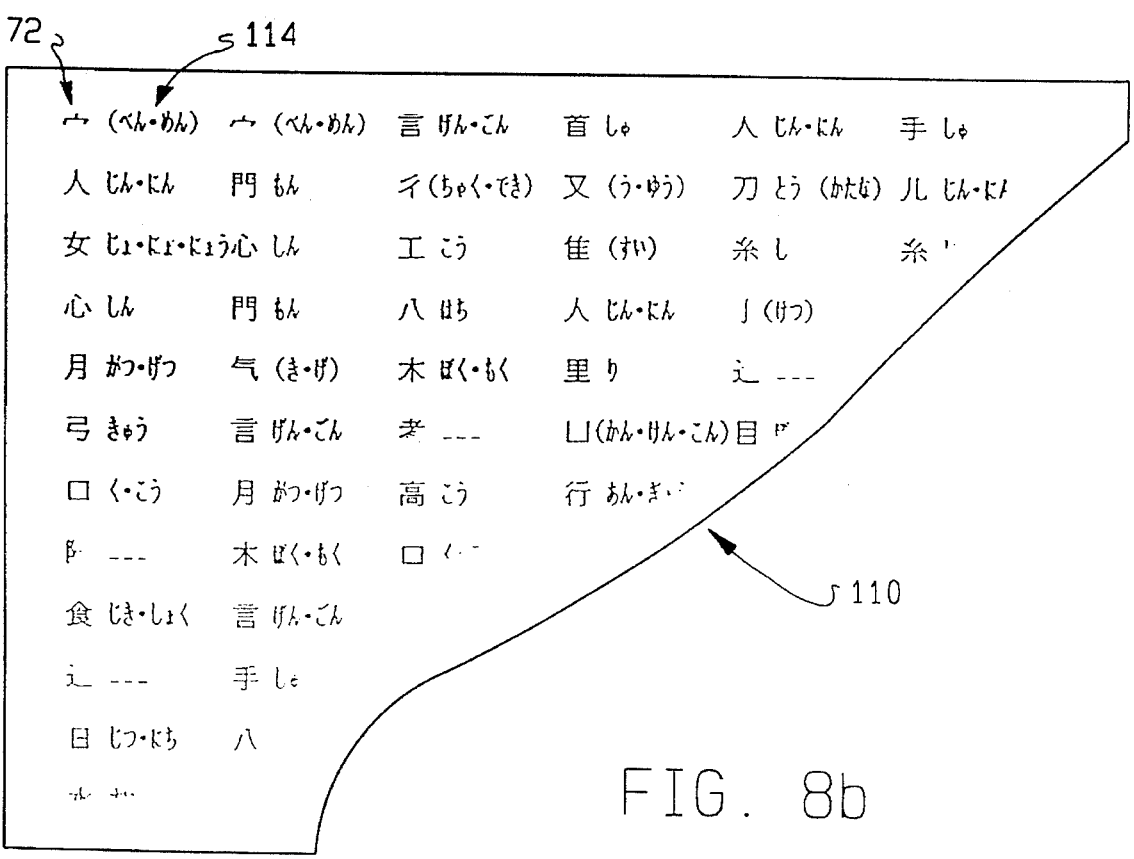
FIG. 8b is a section of the radicals of FIG. 8a and their on-yomi.

FIG. 8b presents the compilation of radicals that double as kanji 110. The radicals that double as kanji compilation 110 is presented in the systematic order format to correspond to FIG. 8a. In this compilation, when the radical 72 does not double as a kanji, the radical 72 is presented in the corresponding location to FIG. 8a and is followed by dashes 112. When the radical 72 does double as a kanji, the radical 72 is presented and the on-yomi reading 114 is presented to the right thereof.

Figure 9A:
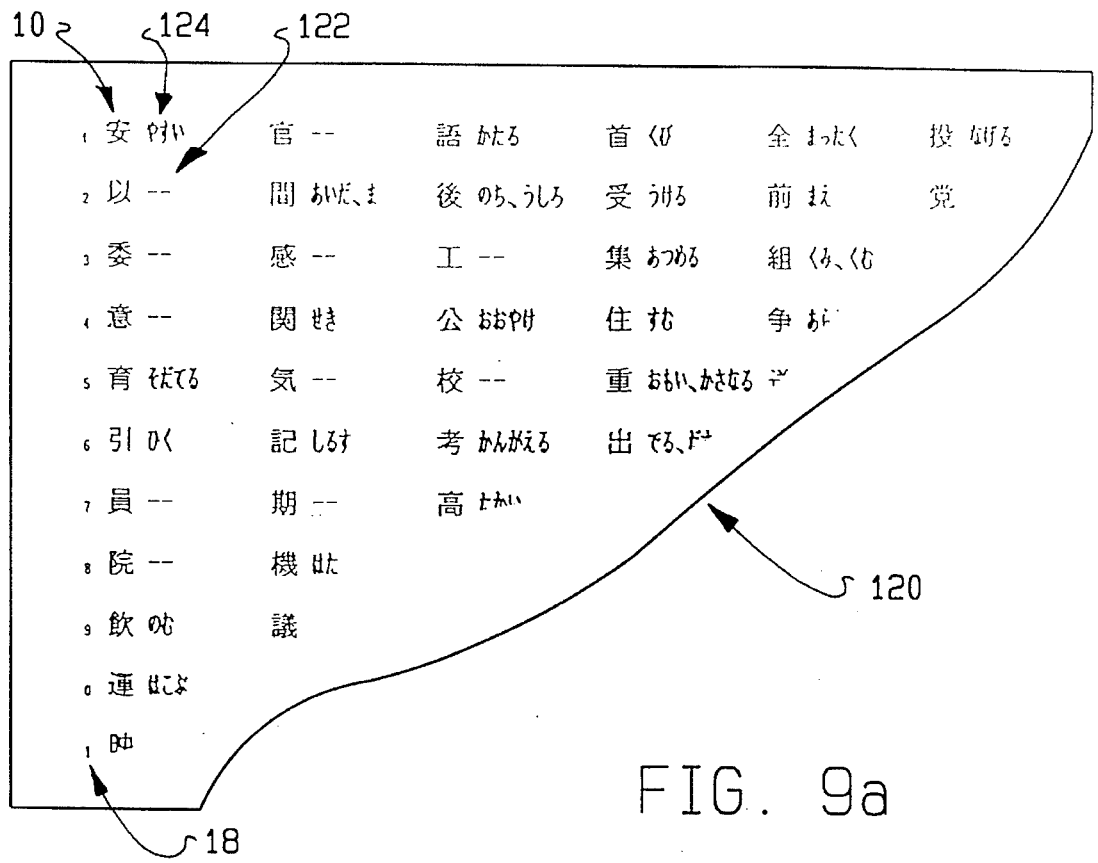
FIG. 9a is a section of the key kanji and kun-yomi in Japanese.

FIG. 9a presents a compilation of kun-yomi 120 or native Japanese readings of the key kanji 10. The kun-yomi reading of a kanji is used when a Japanese word is written using a single kanji character and hiragana. The kun-yomi 124 are presented in the systematic order adjacent to the key kanji 10. When no kun-yomi reading exists for the corresponding key kanji 10, a double dash 122 is provided to enable the student to maintain and follow the corresponding locations to key kanji 10 locations.

Figure 9B:
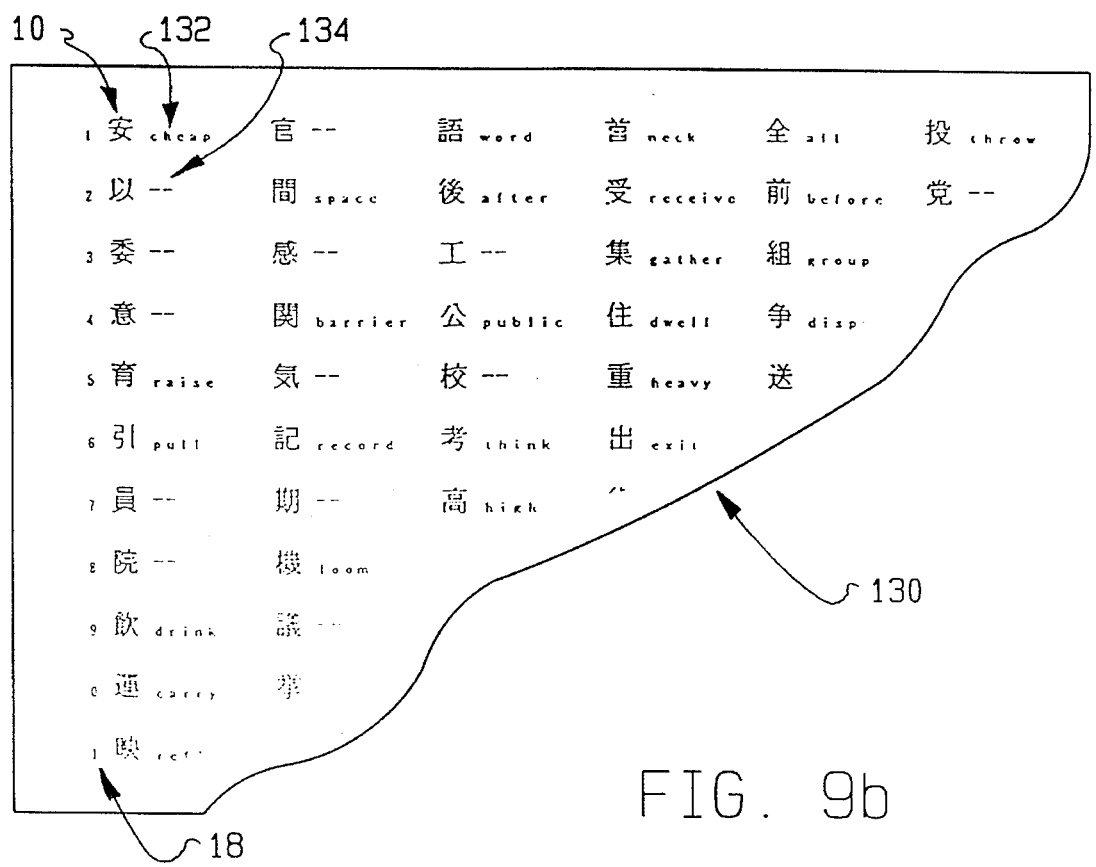
FIG. 9b is a section of the key kanji and a translation of the kun-yomi in English.

FIG. 9b presents a compilation of kun-yomi English meanings 130 to correspond to the kun-yomi compilation 120. Where appropriate, the key kanji 10 is provided with the English meaning 132 of the kun-yomi 120 to the right thereof. Again, where no kun-yomi exists, a dash line 134 is presented where the English definition would be.

Figure 10A:
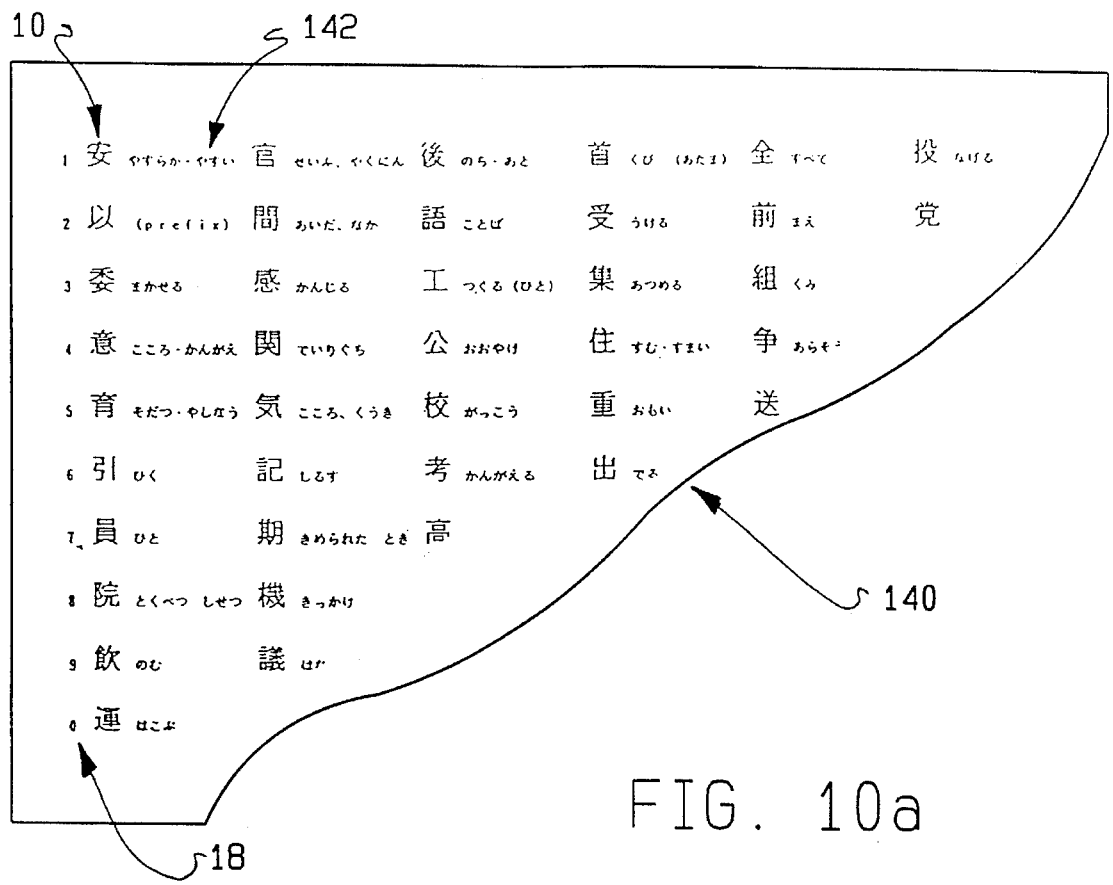
FIG. 10a is a section of the key kanji and key kanji definitions in Japanese.

FIG. 10a is a compilation of key kanji and meanings 140. The key kanji 10 are provided in the systematic order to correspond to FIG. 1a along with the Japanese meaning 142 to the right thereof.

Figure 10B:
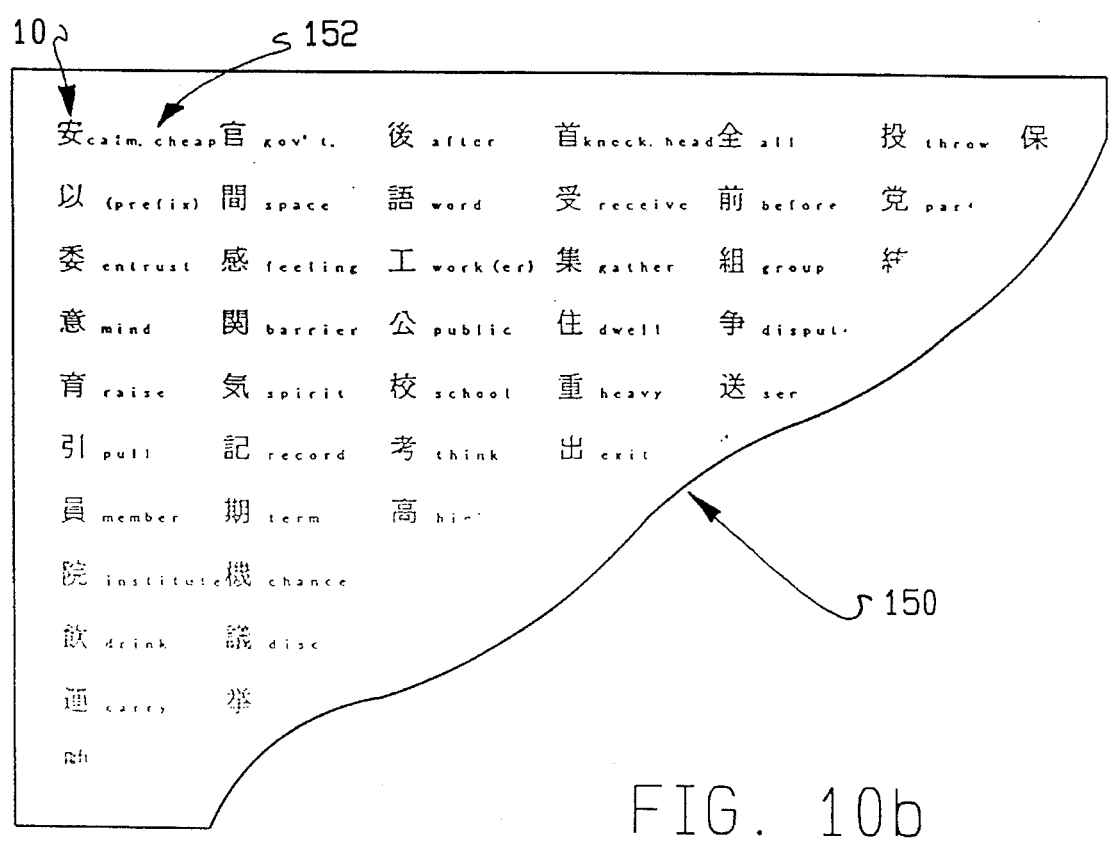
FIG. 10b is a section of key kanji and key kanji definitions in English.

FIG. 10b is a compilation of key kanji and English meanings 150. The key kanji 10 again are provided in the systematic order to correspond to FIG. 1a with the English meaning 152 to the right thereof.

FIG. 11 is a compilation of key kanji compounds 160. The compilation of key kanji compounds 160 is comprised of two or more character compounds 160. The key kanji 10 of the compounds 160 are presented in the systematic order to correspond to FIG. 1a. A second character 162 of each compound 160 is also a key kanji and is located adjacent and to the right of the first key kanji 10.

FIG. 12 is a compilation of the key kanji and Japanese Industrial Standard (JIS) Code numerals 170. The key kanji and JIS Code numerals compilation 170 is also presented in the systematic order to correspond to FIG. 1a. Here, the key kanji 10 are presented with the corresponding JIS Code numeral 172 to the right thereof for approximately instantaneous reference.

Figure 13A:
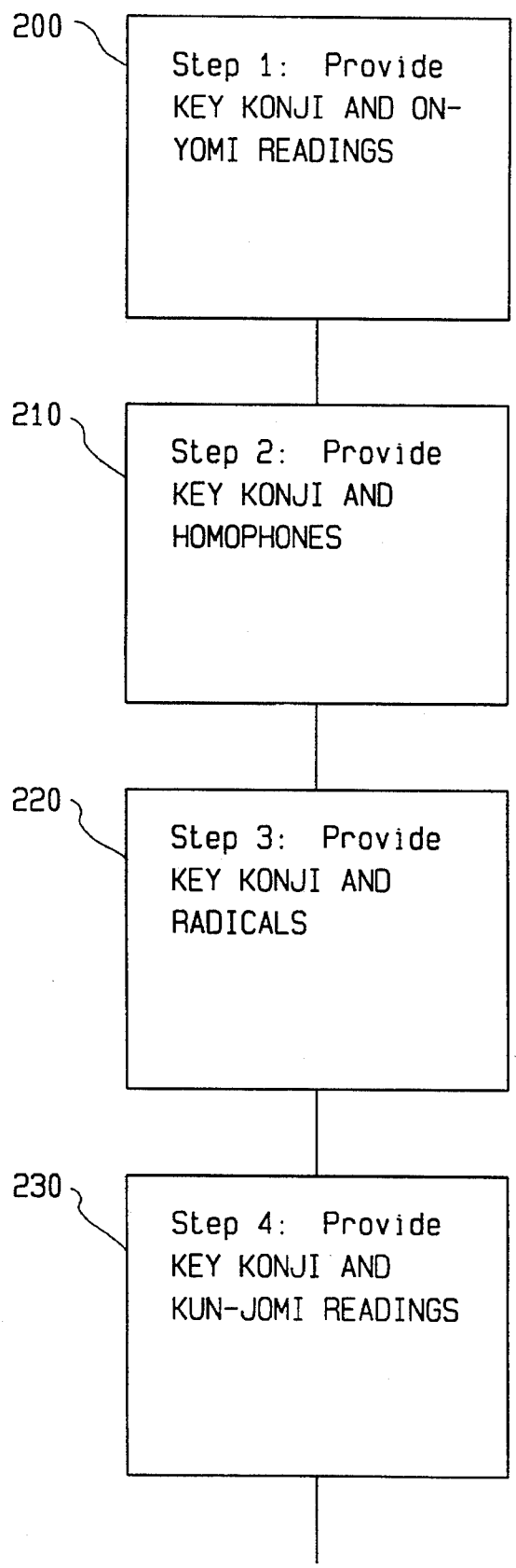
FIG. 13a is a block diagram of the first four steps of the method of teaching Japanese according to the present invention.
Figure 13B:
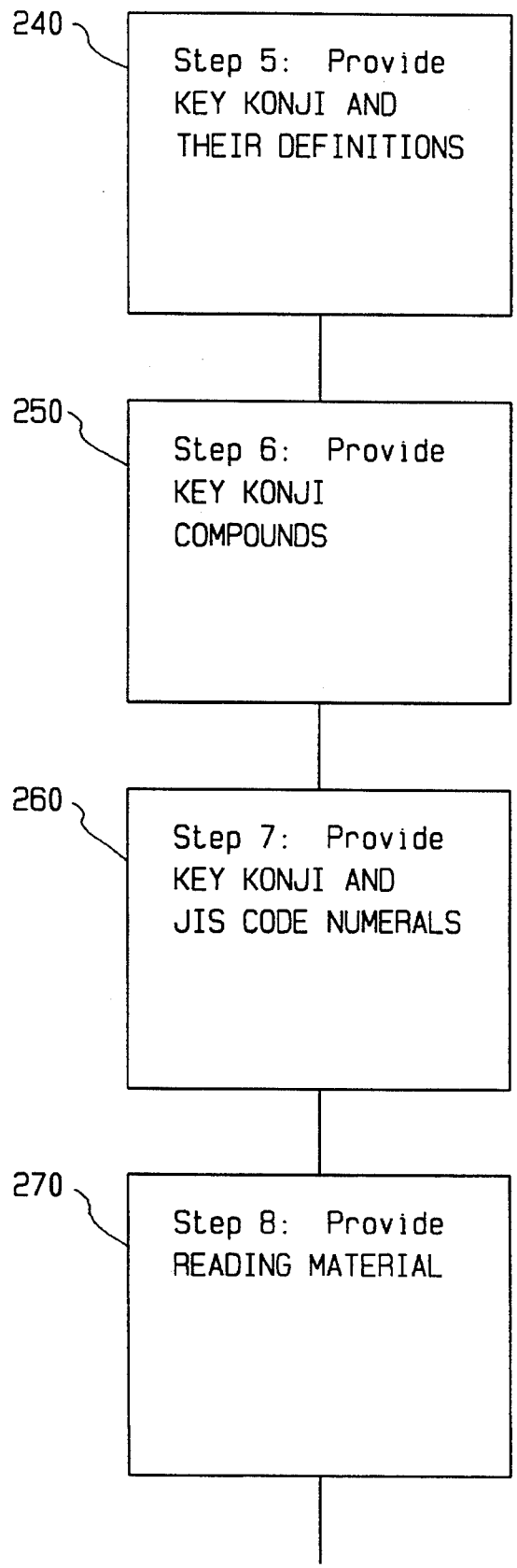
FIG. 13b is a block diagram of the last four steps of the method of teaching Japanese according to the present invention.

FIGS. 13a and 13b provide a block diagram of the preferred method of teaching Japanese according to the present invention. Each of the steps of the method as shown in FIGS. 8a and 8b are discussed with reference to the preceding figures for further definition.

A first step 200 preferably comprises the steps of providing key kanji 10 and on-yomi readings 20, 30 and 40 of the key kanji as shown in FIGS. 1a, 1b, 2a, 2b, 3a and 3b. In the preferred embodiment, the key kanji 10 are provided in well organized and easy to reference manner such as a column 12 and row 14 format with a numerical index 18 on a single sheet of material 16 as in FIG. 1a. The on-yomi readings 20, 30 and 40 should be provided adjacent to the key kanji 10 for quick and easy referencing. In the preferred embodiment, the key kanji 10 are provided on a single sheet of material with the on-yomi reading 20, 30 and 40 on a sheet of material 26, 36 and 46 facing the key kanji 10. In this manner, the student can examine the key kanji 10 to recognize the character and then quickly refer to the on-yomi 20, 30 and 40 reading. The first step 200 is preferably comprised of three cycles: first, providing the key kanji 10 with the on-yomi in roman characters 20 adjacent thereto (FIGS. 1a and 1b); second, providing the key kanji 10 with the on-yomi reading in hiragana 30 adjacent thereto (FIGS. 2a and 2b); and third, providing the key kanji 10 with the on-yomi in katakana 40 adjacent thereto (FIGS. 3a and 3b). In the preferred embodiment, this is accomplished by providing the key kanji 10 on a single sheet of material 16 three separate times as shown in FIGS. 1a, 2a and 3a with the three on-yomi readings 20, 30 and 40 on corresponding facing sheets of material 26, 36 and 46. In this manner, the student is repeating the on-yomi learning with three separate and distinct forms of compilations of on-yomi readings for improved memorization from repetition and for learning hiragana and katakana.

In an embodiment of the invention, the first step can include teaching the student partial cognates 15 and true cognates 17. This can be accomplished by presenting either the partial cognates 15 (FIG. 2a) or true cognates 17 (FIG. 3a) beside the key kanji 10 so that the student can recognize the shared grapho-phonetic element between the kanji.

A second step 210 consist of providing the key kanji 10 and corresponding common homophones 52. As shown in FIG. 4a, the preferred method of presenting common homophones 52 is to present the common homophones 52 adjacent to the key kanji 10. In this step the student can greatly increase the number of kanji recognized by the student. First, the student is again repeating the on-yomi readings of the key kanji because the key kanji 10 are presented in the same order as FIG. 1a with the same index 18. Second, the student will recognize that the common homophones 52 are generally similar to the key kanji 10 because they share a grapho-phonetic element. This is emphasized even greater by having the student review the multiple homophones 60 as shown in FIG. 4b. Here, the more common homophones 64 are presented with the less common homophones 66 presented to the right thereof with a dot 62 juxtaposed therebetween. Since the homophones 60 have the same on-yomi reading as the key kanji 10, the student greatly increases the number of kanji she can read by recognizing the homophones 64 and 66 of the key kanji 10.

A third step 220 consists of teaching the student radicals. In the preferred embodiment, the key kanji radicals 72 are compiled with the key kanji 10 as shown in FIGS. 5a, 6a and 8a. The radicals 72 should be presented with key kanji 10 that either includes the radical or is often combined with the radical. In this manner, the student is familiarized with the radicals 72. This step also teaches the student various sections of the key kanji 10 because many of the key kanji 10 include the radical 72. Thus, the student can more easily identify the key kanji 10.

The third step 220 preferably consists of several cycles that reinforce the teaching of the radicals 72. In the first two cycles, the English names 80 and Japanese names 90 and 100 are provided. By providing the radical 72 adjacent to the radical names as shown in FIGS. 5a and 5b and in FIGS. 6a and 6b, the students familiarity with the radicals 72 is increased due to the repetition. Another cycle consist of identifying the Japanese name of the radicals 72 written in hiragana as shown in FIGS. 7a and 7b. To increase the student's recognition of both the radicals 72 and hiragana, the names of the radicals 72 are written in hiragana, but presented according to the reference numerals 74 as shown in FIG. 7b. Then still another cycle consists of providing the student a compilation of the radicals 72 that double as kanji 110. As shown in FIG. 8b, for the radicals that double as kanji 110 the student is presented with the kanji radical 72 in the order that follows the radicals presented in FIG. 8a with the on-yomi reading 114 directly adjacent thereto. This cycle also consist of repeating the teaching of the kanji/radicals 72 that are most common by presenting them repeatedly as shown in FIG. 8b. This cycle again increases the number of kanji that the student knows, and teaches and reinforces the teachings of many radicals.

The fourth step 230 comprises the teaching of kun-yomi readings 120 and 130 of the key kanji 10. As shown in FIGS. 9a and 9b, the kun-yomi readings or native Japanese readings, are presented in Japanese 120 and in English 130 directly adjacent to the key kanji to confirm the kanji reading more easily. Again, the key kanji 10 are arranged in the corresponding order to FIG. 1a so that the student can quickly associate the kanji kun-yomi readings 120 and 130.

In FIG. 13b, the fifth through eighth steps 240, 250, 260 and 270 are shown. The fifth step 240 preferably comprises teaching the student the definitions 140 and 150 of the key kanji as shown in FIGS. 10a and 10b. It should be noted that the student should be very familiar with the key kanji 10 by this point. The student has memorized the key kanji on-yomi readings 20, 30 and 40, homophones 50 and the kanji radicals 72 for many of the key kanji 10 in the systematic order of FIG. 1a repeated for each step.

The fifth step 240 comprises the cycles of learning the kanji definitions in Japanese 140 and in English 150 as shown in FIGS. 10a and 10b respectively. Again the student is presented with the key kanji 10 in the order that corresponds to FIG. 1a and the material being taught, the Japanese meanings 142 and the English meanings 152, is presented directly adjacent to the key kanji 10. The material presented in this step can also be used later as reference guides for the definitions 140 and 150 of the key kanji 10.

The sixth step 250 comprises reinforcing the teaching of the key kanji 10 by presenting the same in compound form 160 as shown in FIG. 11. Again, the key kanji 10 are presented in the order corresponding to FIG. 1a. However, in this step, the key kanji 10 are followed by at least a second key kanji 162 so that kanji compounds 160 are formed. This step is used as a drill exercise for improving the students recognition of the key kanji 10. The step consists of reading each of the key kanji compound 160 and going back to step 1 to reaffirm the on-yomi reading for any of the key kanji 10 that the student cannot recognize and read.

The seventh step 260 comprises teaching the student to use the JIS Code numerals 172 for the key kanji 10. This step is again accomplished by presenting the key kanji 10 in the corresponding order to FIG. 1a with the material to be taught, the JIS Code numerals 172, directly adjacent thereto. This provides the student with quick reinforcement of the JIS Code numerals 172. The material presented in this step can again be memorized or merely familiarized for use as a reference tool later. This is particularly useful in conjunction with an electronic dictionary that uses the JIS Code. This step can further include providing the student with steps on how to use the JIS Code. By knowing the JIS Code for the key kanji, the student can look up the meanings of words containing the key kanji 10 as part of a kanji compound.

The eighth step 270 comprises reading Japanese text. In this step 270, the student is presented with at least one Japanese text to read. Preferably, this step is supplemented with providing explanation of the text or information on using the key kanji and JIS Code along with the text. In the preferred embodiment, the English translation, on-kun reading, radical and JIS Code information is provided for the student to follow as she reads through the text.

Figure 14A:
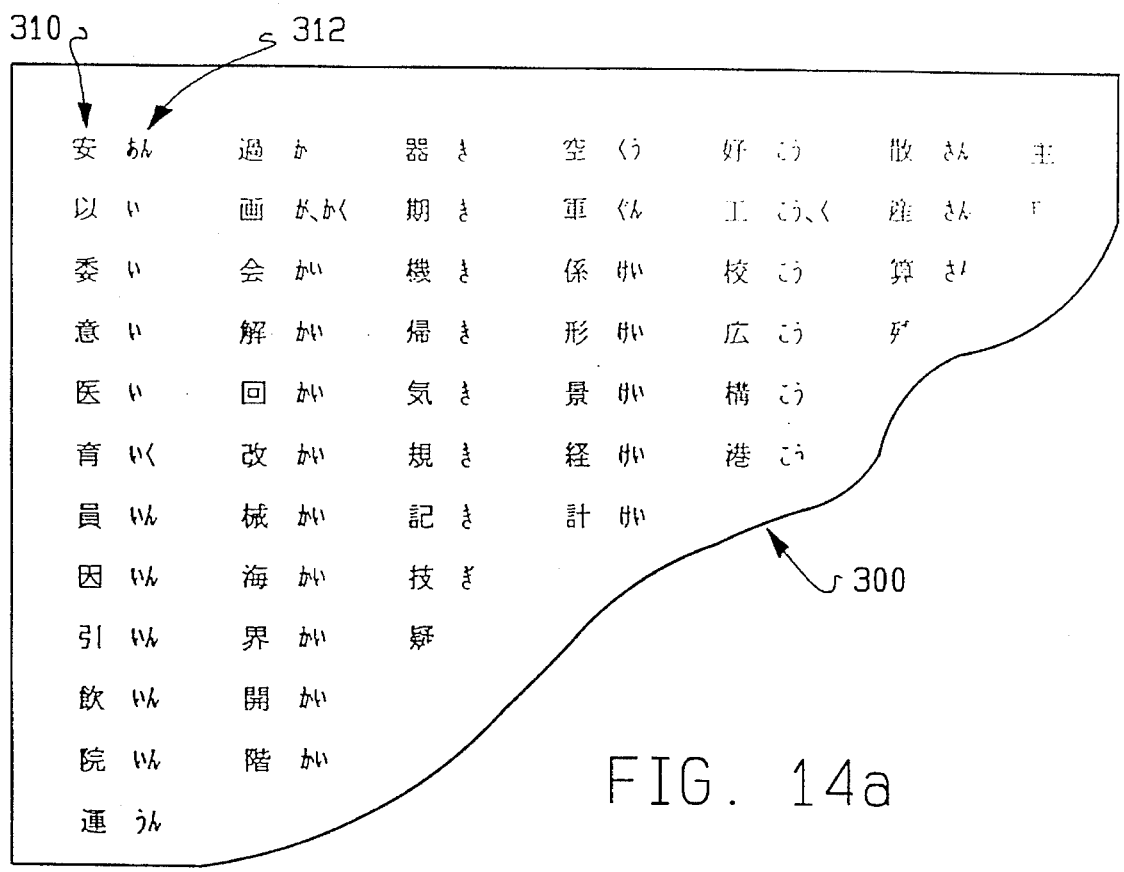
FIG. 14a is a section of a plurality of expanded key kanji being presented in a column and row format with on-yomi readings.
Figure 14B:
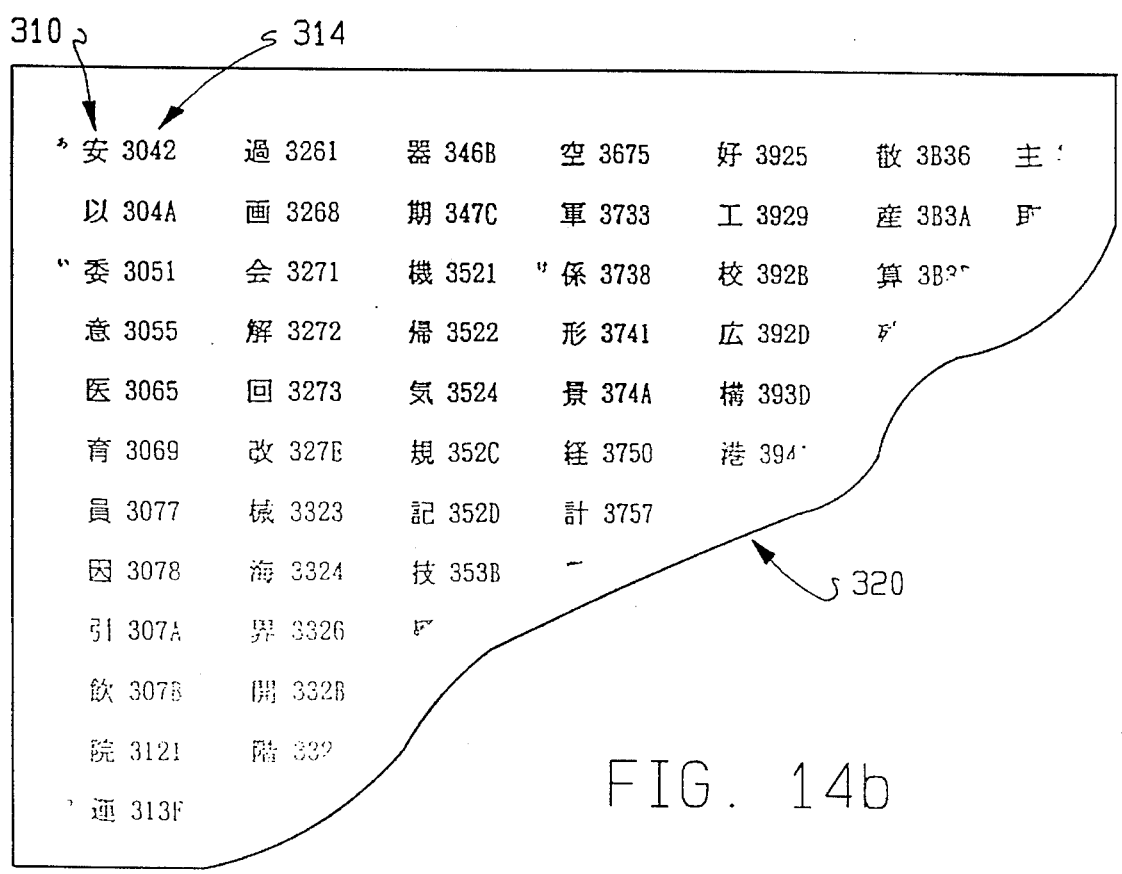
FIG. 14b is a section of a plurality of expanded key kanji being presented in a column and row format with the JIS Code numerals.

Referring now to FIGS. 14a and 14b, a section of a compilation of expanded key kanji and on-yomi readings 300 is shown. This compilation 300 consists of expanded key kanji 310 being presented in a systematic order of column and rows according to the gojuu-on zu with the on-yomi reading 312 directly adjacent to the expanded key kanji 310. This list of expanded key kanji 310 differs from the key kanji 10 in that this list consists of 420 key kanji. Essentially, this list of expanded key kanji 310 is comprised of the preferred 210 key kanji 10 with another 210 common kanji integrated therein. The expanded key kanji 310 can be used to replace the key kanji 10 in the steps discussed herein or, preferably, can be provided to the student learning kanji after the student has master the key kanji 10. This way, the student can increase the number of kanji she knows or could use the compilation 300 as a dictionary type reference.

FIG. 14b further discloses a compilation 320 comprising of the expanded key kanji 310 with the JIS Code numerals 314 directly adjacent thereto. Similarly, this compilation of key kanji and JIS Code numerals 320 is preferably used as a dictionary type reference for the kanji student after the student has mastered the key kanji 10.

FIG. 15 further discloses a section of common kanji compounds 330. In an embodiment of the invention, the student can be presented with common kanji compounds 330 for reading after she has master the key kanji 10 or expanded key kanji 310. This will enable the student to practice reading kanji compounds.

Appendix A (filed with the present application and referred to above in the "Cross-Reference to Submitted Appendices") includes the complete compilations of the preferred 210 key kanji, the key kanji on-yomi readings, key kanji homophones, radicals and their names, radicals that double as kanji, key kanji kun-yomi readings, key kanji meanings, key kanji collated with the JIS Code, 210 key kanji compounds, a publication written in Japanese along with the translation to English and on-yomi reading in roman characters, 420 key kanji with on-yomi readings and JIS Code numerals, a compilation of common kanji compounds and the academic list of kanji which references the 996 characters that are taught in Japanese elementary school.

The above description and the submitted Appendix A are merely illustrative of the invention, and numerous modifications to the method and support material may be devised by those skilled in the art without departing from the inventive concept herein. Accordingly, the true spirit and scope of the present invention is only to be determined by the claims appended hereto.

I claim:

1. A method for teaching a language based on the use of kanji characters, comprising the steps of:

displaying a compilation of key kanji in a systematic order;

providing a first corresponding compilation of on-yomi readings of said key kanji; and reinforcing the understanding of the first compilation of on-yomi readings by presenting a second corresponding compilation of on-yomi readings.

2. The method of claim 1, which further comprises providing said first on-yomi readings in a written format that substantially corresponds to said systematic order.

3. The method of claim 2, which further comprises providing said first on-yomi readings in Roman characters.

4. The method of claim 2, which further comprises providing said first on-yomi readings in a corresponding compilation of hiragana phonetic readings of said key kanji.

5. The method of claim 3 or 4, which further comprises presenting said second corresponding compilation of on-yomi readings in katakana characters.

6. The method of claim 1, further comprising the step of providing a third compilation of corresponding on-yomi readings in a distinct form from said first and second compilations of on-yomi readings to reinforce the understanding of the first and second compilations of on-yomi readings.

7. The method of claim 1, which further comprises displaying approximately 180 to 240 of the key kanji in said key kanji compilation.

8. The method of claim 7, which further comprises presenting said key kanji in a plurality of columns according to the gojuu-on zu.

9. The method of claim 8, wherein said key kanji are compiled on a first sheet of material.

10. The method of claim 9 which further comprises providing an index to locate said kanji on said sheet.

11. The method of claim 10, wherein said step of providing a first corresponding compilation of on-yomi readings comprises displaying said second sheet of material adjacent to said first sheet of material.

12. The method of claim 9, wherein said first corresponding compilation of on-yomi readings are compiled on a second sheet of material.

13. The method of claim 1 which further comprises teaching a student to read text of kanji by having the student learn the meanings of the key kanji.

14. The method of claim 13 wherein the text is in Japanese.

15. A method of teaching reading of a language that uses kanji characters, comprising the steps of:

displaying a compilation of approximately 180 to 240 key kanji;

providing a corresponding compilation of the phonetic readings of said key kanji; and displaying a compilation of radicals of said key kanji.

16. The method of claim 1 or 15, further comprising the step of displaying a compilation of homophone kanji that are homophones of said key kanji.

17. The method of claim 16, wherein said compilation of homophone kanji comprises homophone kanji displayed adjacent to key kanji.

18. The method of claim 15, wherein said step of providing a corresponding compilation of the phonetic readings of said key kanji comprises displaying the phonetic readings in Roman characters.

19. The method of claim 15, wherein said step of providing a corresponding compilation of the phonetic readings of said key kanji comprises displaying the phonetic readings in hiragana.

20. The method of claim 15, wherein said step of providing a corresponding compilation of phonetic readings of said key kanji comprises at least one of the steps of:

displaying the phonetic readings of said key kanji in Roman characters;

displaying the phonetic readings of said key kanji in hiragana; or displaying the phonetic readings of said key kanji in katakana.

21. The method of claim 20, further comprising the step of:

repeating the step of displaying the compilation of key kanji prior to the step of displaying the phonetic readings of the key kanji in hiragana or prior to the step of displaying the phonetic readings of the key kanji in katakana.

22. The method of claim 15 which further comprises teaching a student to read text of kanji by having the student learn the meanings of the key kanji.

23. The method of claim 21 wherein the text is in Japanese.

24. A method of teaching a language that uses Chinese characters, comprising the steps of:

displaying a compilation of approximately 180 to 240 key kanji;

providing a corresponding compilation of the phonetic readings of said key kanji; and displaying a compilation of radicals.

25. The method of claim 15 or 24, wherein said step of displaying a compilation of radicals comprises displaying a compilation of radicals and key kanji comprising radicals adjacent to key kanji.

26. The method of claim 25, further comprising the steps of:

providing the names of the radicals; and presenting the on-yomi reading of kanji radicals from the compilation radicals that double as kanji.

27. The method of claim 1, 15 or 24, further comprising the step presenting the kun-yomi reading of said key kanji.

28. A method of teaching a student to read a language based on Japanese Kanji, comprising the steps of:

displaying a plurality of about 180 to 240 key kanji presented in a systematic order;

displaying a corresponding compilation of on-yomi readings for said key kanji;

displaying a corresponding compilation of homophones for said key kanji;

displaying a corresponding compilation of radicals for said key kanji;

displaying a corresponding compilation of kun-yomi readings for said key kanji;

displaying a corresponding compilation of meanings of said key kanji;

displaying a corresponding compilation of key kanji with Japanese Industrial Standard Code;

displaying a plurality of key kanji compounds; and providing said student with a writing in Japanese with a corresponding English translation and on-kun reading.

29. An instruction device comprising: a compilation of approximately 180 to 420 key kanji organized and displayed for visual presentation in a systematic order, means for presenting on-yomi readings in the systematic order to correspond to substantially all of said key kanji, means for reinforcing the on-yomi readings and means for presenting a plurality of radicals organized for visualization with said key kanji.

30. An instruction device comprising: a compilation of approximately 180 to 420 key kanji organized and displayed for visual presentation in a systematic order, means for presenting on-yomi readings in the systematic order to correspond to substantially all of said key kanji, and means for providing JIS Code numerals for said key kanji.

31. A method of teaching a language written in kanji characters, comprising the steps of:

presenting a compilation of approximately 180–240 key kanji in a systematic order;

providing phonetic readings of the key kanji in Roman characters, hiragana and katakana;

reinforcing the phonetic readings of the key kanji with a compilation of common homophones of the key kanji;

increasing the recognition of said key kanji by presenting radicals associated with the key kanji and the names of the key kanji;

providing the meanings of the key kanji; and presenting a writing in kanji in combination with at least one of the phonetic reading;

the English translation; or

JIS Code information.

32. The method of claim 31 further comprising the step of presenting the compilation of key kanji prior to each provision of the phonetic readings of the key kanji.

33. The method of claim 31 which further comprises providing a key kanji and common homophones compilation to increase the number of kanji taught.

34. The method of claim 31 which further comprises presenting the names of the radicals and further increasing the number of kanji learned by providing at least an on-yomi reading for a portion of the radicals that double as kanji.

35. The method of claim 31 which further comprises the step of reinforcing the key kanji by presenting a compilation of key kanji compounds comprised of at least two key kanji.

36. The method of claim 31 which further comprises the step of providing the kun-yomi of a portion of the key kanji for which kun-yomi exist.

* * * * *